Aug. 19, 1947.  A. PARTIN  2,426,119
CONTAINER WITH DISCHARGE PASSAGE ARRANGED FOR MEASURING BY TIPPING
Filed July 19, 1943

Albert Partin
INVENTOR.

BY
Victor J. Evans & Co.
ATTORNEYS

Patented Aug. 19, 1947

2,426,119

UNITED STATES PATENT OFFICE 2,426,119

CONTAINER WITH DISCHARGE PASSAGE ARRANGED FOR MEASURING BY TIPPING

Albert Partin, Livingston, Mont.

Application July 19, 1943, Serial No. 495,332

2 Claims. (Cl. 222—457)

My invention relates to containers for sugar and the like, which are employed for table service, and has among its objects and advantages the provision of an improved dispensing container designed to dispense predetermined quantities of material, but in which the construction is such as to facilitate adjustment to vary the quantity of the measured portions.

Figure 1:
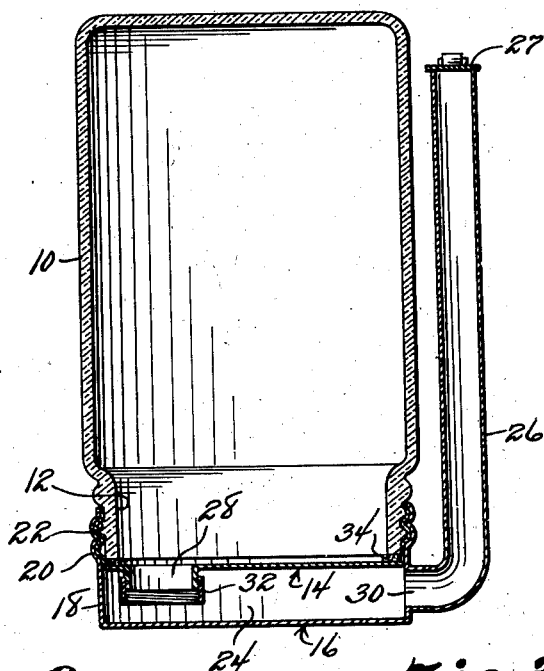
Figure 1 is a sectional view of a container in accordance with my invention.
Figure 4:
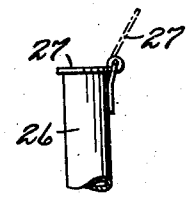
Figure 4 is a view of a cover end of a dispensing spout.
Figure 2:
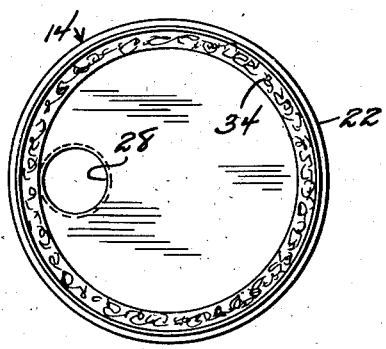
Figure 2 is an inside face view of a cover member.
Figure 3:
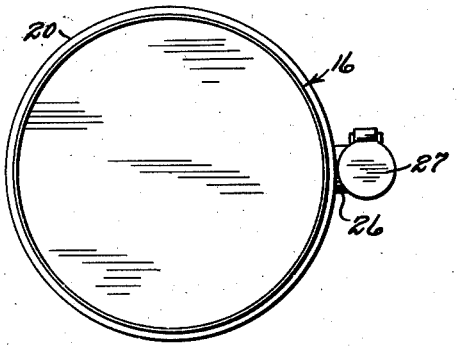
Figure 3 is a bottom plan view of the container.
Figure 5:
Figure 5 is a perspective view of a measuring adjustment.

In the embodiment of the invention selected for illustration, I make use of a container 10 having a threaded neck 12 for connection with a screw cap 14. A second cap 16 is provided with an annular flange 18 formed with threads 20 having threaded connection with the threaded flange 22 on the cap 14. The two caps 14 and 16 are spaced in Figure 1 to provide a dispensing chamber 24.

A spout 26 has one end attached to the annular flange 18 and communicates with the chamber 24. This spout is provided with a hinged cover 27 at its discharging end.

A dispensing neck 28 is formed on the cap 14 diametrically opposite the inlet end 30 of the spout 26. The neck 28 provides an opening communicating with the container 10 so that the material in the container may flow through the neck and into the chamber 24. The flow continues until the material has piled up to the end of a sleeve 32 having threaded connection with the neck 28. The distance between the lower end of the sleeve 32 and the bottom face of the cover 16 determines the measured quantity of material to be dispensed.

In operation, the material heaped underneath the sleeve 32 is dispensed by merely tightening the container 10 to cause the material in the chamber 24 to flow into and from the spout 26.

A gasket 34 is interposed between the cover 14 and the end of the neck 12. The cap 14 is first threaded onto the neck 12, after which the cap 16 is threaded on the cap 14. Both caps are threaded tightly home and are thereby effectively connected with the container 10. However, the cap 16 may be unthreaded from the cap 14, and the sleeve 32 may be easily adjusted to vary the measured quantity of material to be dispensed from the chamber 24.

Without further elaboration, the foregoing will so fully explain my invention, that others may, by applying current knowledge, readily adapt the same for use under various conditions of service.

I claim:

1. A dispensing device comprising a receptacle for the material to be dispensed and having an open top, a pair of caps threadedly engaged with each other to form a chamber between the caps, one of said caps constituting a cover for the open top of the receptacle, said latter cap having an outlet therein for the material in the receptacle to the chamber between the caps, a longitudinally adjustable sleeve about said outlet to regulate the quantity of material introduced into the chamber, an elongated outlet spout for the chamber extending parallel with the receptacle and terminating at a point adjacent its bottom a hinged cover at its discharging end, and the outlet in the chamber being diametrically opposite the inlet of said outlet spout.

2. The invention as in claim 1, wherein the sleeve is threaded to adjust its position with respect to the second cap to regulate the quantity of material dispensed.

ALBERT PARTIN.

REFERENCES CITED

The following references are of record in the file of this patent:

UNITED STATES PATENTS

| Number | Name | Date |
|---|---|---|
| 2,091,929 | Kappenberg | Aug. 31, 1937 |
| 1,322,881 | Dickey | Nov. 25, 1919 |
| 2,233,996 | Dent | Mar. 4, 1941 |
| 1,972,154 | Martin | Sept. 4, 1934 |
| 1,220,689 | Sanderson | Mar. 27, 1917 |
| 1,009,550 | Moys | Nov. 21, 1911 |